United States Patent [19]
Kunkel et al.

[11] Patent Number: 5,961,603
[45] Date of Patent: Oct. 5, 1999

[54] ACCESS SYSTEM AND METHOD FOR PROVIDING INTERACTIVE ACCESS TO AN INFORMATION SOURCE THROUGH A NETWORKED DISTRIBUTION SYSTEM

[75] Inventors: Gerard Kunkel, Yardley; Harold Krisbergh, Rydal; Aaron Grosky, Doylestown; Jae Hea Edward Lee, Bensalem, all of Pa.; Joseph E. Augenbraun, Princeton, N.J.

[73] Assignee: WorldGate Communications, Inc., Bensalem, Pa.

[21] Appl. No.: 08/934,985

[22] Filed: Sep. 22, 1997

Related U.S. Application Data

[63] Continuation-in-part of application No. 08/630,397, Apr. 10, 1996.

[51] Int. Cl.[6] .................................................. G06F 15/16
[52] U.S. Cl. ........................................ 709/229; 709/225
[58] Field of Search ........................ 395/200.47, 200.49, 395/200.59, 200.48, 200.56; 709/217, 219, 226, 225, 259, 218

[56] References Cited

U.S. PATENT DOCUMENTS

| | | | |
|---|---|---|---|
| 4,450,477 | 5/1984 | Lovett | 358/86 |
| 4,928,177 | 5/1990 | Martinez | 358/142 |
| 5,550,578 | 8/1996 | Hoarty et al. | 348/7 |
| 5,566,306 | 10/1996 | Ishida | 395/309 |
| 5,630,119 | 5/1997 | Aristides et al. | 395/601 |
| 5,654,748 | 8/1997 | Matthews, III | 348/13 |
| 5,659,350 | 8/1997 | Hendricks et al. | 348/6 |
| 5,689,799 | 11/1997 | Dougherty et al. | 455/2 |
| 5,708,961 | 1/1998 | Hylton et al. | 348/7 |
| 5,761,602 | 6/1998 | Wagner et al. | 455/3.1 |
| 5,768,539 | 6/1998 | Metz et al. | 395/200.79 |
| 5,774,666 | 6/1998 | Portuesi | 395/200.48 |
| 5,778,181 | 7/1998 | Hidery et al. | 395/200.48 |
| 5,818,438 | 10/1998 | Howe et al. | 345/327 |
| 5,818,441 | 10/1998 | Throckmorton et al. | 345/328 |
| 5,818,935 | 10/1998 | Maa | 380/20 |
| 5,832,223 | 11/1998 | Hara et al. | 395/200.47 |

Primary Examiner—Mehmet B. Geckil
Attorney, Agent, or Firm—Jones, Tullar & Cooper

[57] ABSTRACT

A system and method for accessing Internet-based and other information through a user television in a television distribution network enables a user to access and view information which is related to the programming content of a currently viewed television broadcast. This concept, known as channel hyperlinking, enables a television viewer to download Internet Web pages, and the like, which are related to a currently viewed advertisement, program, newscast, etc. To facilitate channel hyperlinking, each user of the system sends channel hyperlink requests through an upstream channel to a network headend by actuating a hyperlink button on a television remote control, for example. The network headend is interfaced to the Internet by means of an Internet Service Provider (ISP), and downloads HTML Web page data from the Internet to the requesting user. Each television broadcast to be linked to the Internet-based or other information is transmitted by the original broadcaster with an identification tag which identifies the Universal Resource Locator (URL) or address where the program content related information is located. The headend uses the ID tag with channel and time of request information to identify the location of the information to be downloaded to the user. Preferably, the information is pre-cached from the ISP to a headend cache in advance of the broadcast to facilitate quicker downloading of the information to the user.

62 Claims, 6 Drawing Sheets

UPSTREAM RE-SEND
REQUEST 124

UPSTREAM KEYSTROKE 126

UPSTREAM MOUSE MOVEMENT 128

ACCESS SYSTEM AND METHOD FOR PROVIDING INTERACTIVE ACCESS TO AN INFORMATION SOURCE THROUGH A NETWORKED DISTRIBUTION SYSTEM

CROSS-REFERENCE TO RELATED APPLICATIONS

This application is a continuation-in-part of application Ser. No. 08/630,397, filed Apr. 10, 1996.

FIELD OF THE INVENTION

The present invention relates generally to an access system and method for providing interactive access to an information source, such as the Internet, through a networked distribution system, such as a television or broadcast distribution system. More particularly, the present invention relates to a system and method for providing a receiver connected to a networked distribution system with information from the Internet or another information source which is related to the programming content of a currently received television, radio or other transmission.

BACKGROUND OF THE INVENTION

As is well known, the "Internet" is a world-wide interconnected network of computers which provides users with access to a tremendous volume of information on practically any topic one can imagine. However, accessing the information normally requires the use of a personal computer and related hardware and software. Television is another communication medium which has continued to grow over the years with the advent of cable and satellite based distribution systems that provide subscribers with access to upwards of one hundred or more channels. These two communication media have not been combined with one another previously, and a need exists for a system which combines the two media in a convenient, user-friendly manner to provide television viewers with access to information from the Internet or another information source.

SUMMARY OF THE INVENTION

The present invention satisfies the foregoing need by providing a system and method for accessing television or broadcast program content related information from an information source, such as the Internet, through a networked distribution system, such as a television or broadcast distribution system. Conventional television distribution systems, for example, include a television distribution network which is interfaced through communications links (e.g., coaxial cables, optical fibers, radio and satellite wireless links, etc., or combinations thereof) to a plurality of user televisions. In most instances, each television is connected to a set top converter box or terminal which is interfaced between a communication link and the television for receiving and decoding the television signals from the distribution network. Television distribution systems of this type usually provide no or very limited means for a user to communicate through the distribution network to the television content provider.

The distribution system employed in the preferred embodiment of the present invention differs from previous television distribution systems through provision of a plurality of upstream communication channels disposed between the users and the distribution network which enable the users to communicate therewith in real-time. In addition, the television distribution network is interfaced to an information source, such as the Internet, through a headend server and router so that each user can access the information by sending access commands and information requests through the upstream communication channel to the headend server. The headend server retrieves the requested information and downloads it through one of a plurality of downstream television signal channels to the requesting user.

In the preferred embodiment of the present invention, the system is employed specifically for linking real-time broadcast programming content with extensive related information using a technique known as channel hyperlinking. In one specific application relating to broadcast and cable television, channel hyperlinking provides the linking of a specified television frequency or channel to content from an Internet World Wide Web site for the purpose of offering additional information to the television viewer about the currently viewed programming content. As an example, if a user is currently viewing an advertisement for a particular product, they can simply actuate a button on their television remote control, and within seconds, receive additional information on the particular product from an Internet Web site.

To implement the preferred embodiment of the present invention, one or more headend databases are interfaced to the headend server which contain related Internet-based information for the programs and advertisements being broadcast over the television distribution network. More particularly, for each program or advertisement to be associated with an Internet location, a database contains the Uniform Resource Locator (URL) address information for an Internet location which is associated with such programs or advertisements. Preferably, the HTML (Hyper Text Markup Language) Web site data for the specified Internet locations is also pre-stored in a cache that is interfaced to the headend server for substantially reducing access time thereto. To facilitate this predictive caching of the Web site from the Internet, the headend server is interfaced to an Internet Service Provider (ISP), and downloads the Web site data from the ISP to the cache prior to the broadcast of programming which is hyperlinked to the Web site data.

When a system user wishes to access Internet information associated with a program or advertisement they are currently viewing, the user presses a channel hyperlink button on their television remote control. This instructs an application program in the user's set top converter box to send the request to the headend server through one of the upstream channels along with an identification number for the user's set top converter box, and information identifying the channel which the user is viewing. Upon receipt of the request, the headend server determines the exact time of the request from a system clock, and, using the identification number and channel information, accesses the headend database(s) to locate the URL address for the desired Internet information. This information is then passed on to one of a plurality of Internet browser applications with an instruction to download the associated Internet information to the user's set top converter box in accordance with the converter ID number. Typically, the Internet information is HTTP (Hyper Text Transport Protocol) data which is either dynamically accessed from the ISP with an Internet browser in a traditional manner, or which has been cached at the headend server based upon prior or predicted usage.

To determine which Web pages should be associated with each program or advertisement, each broadcast source inserts an identification number or tag in the broadcast signal approximately once every second which identifies the program or advertisement content, as well as timing and duration information associated with such content. The headend database is continually updated with the ID tag information during broadcast. As discussed previously, the headend database also contains URL data which is associated with the particular program or advertising content included in the broadcast content tag information. This is provided as input to the headend database, and is updated as required through separate Internet downloads or through other broadcast or hard copy storage medium (e.g., magnetic tape). In addition, the headend database contains channel mappings which associate particular converter channels with a programming source. In this manner, when a system user actuates the channel hyperlink button, the headend server determines the time of button actuation from a system clock, and matches the converter ID number and channel information with the associated Internet information from the cache or ISP utilizing the channel mapping and content tagged information, as well as the URL data.

A data collection center is also preferably provided for receiving the various broadcast, downloaded, or hard copy information. For example, this center can receive satellite broadcasts from the various broadcast sources (e.g., the television cable networks such as ABC, CBS, NBC, HBO, CNN, ESPN, etc.), and determines the required content tagged information. This center can also receive the downloaded and/or hard copy URL data to be associated with the broadcast programming and advertising content. This information can be assembled in a master database, relevant portions of which are then sent to the headend servers providing the interactive information source according to the present invention. This database information is matched by the headend servers with other database information relating to the applicable channel mappings, channel and timing information to interactively associate the particular programming or advertising content being viewed on the television with associated Internet information.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF A PREFERRED EMBODIMENT

Figure 1:
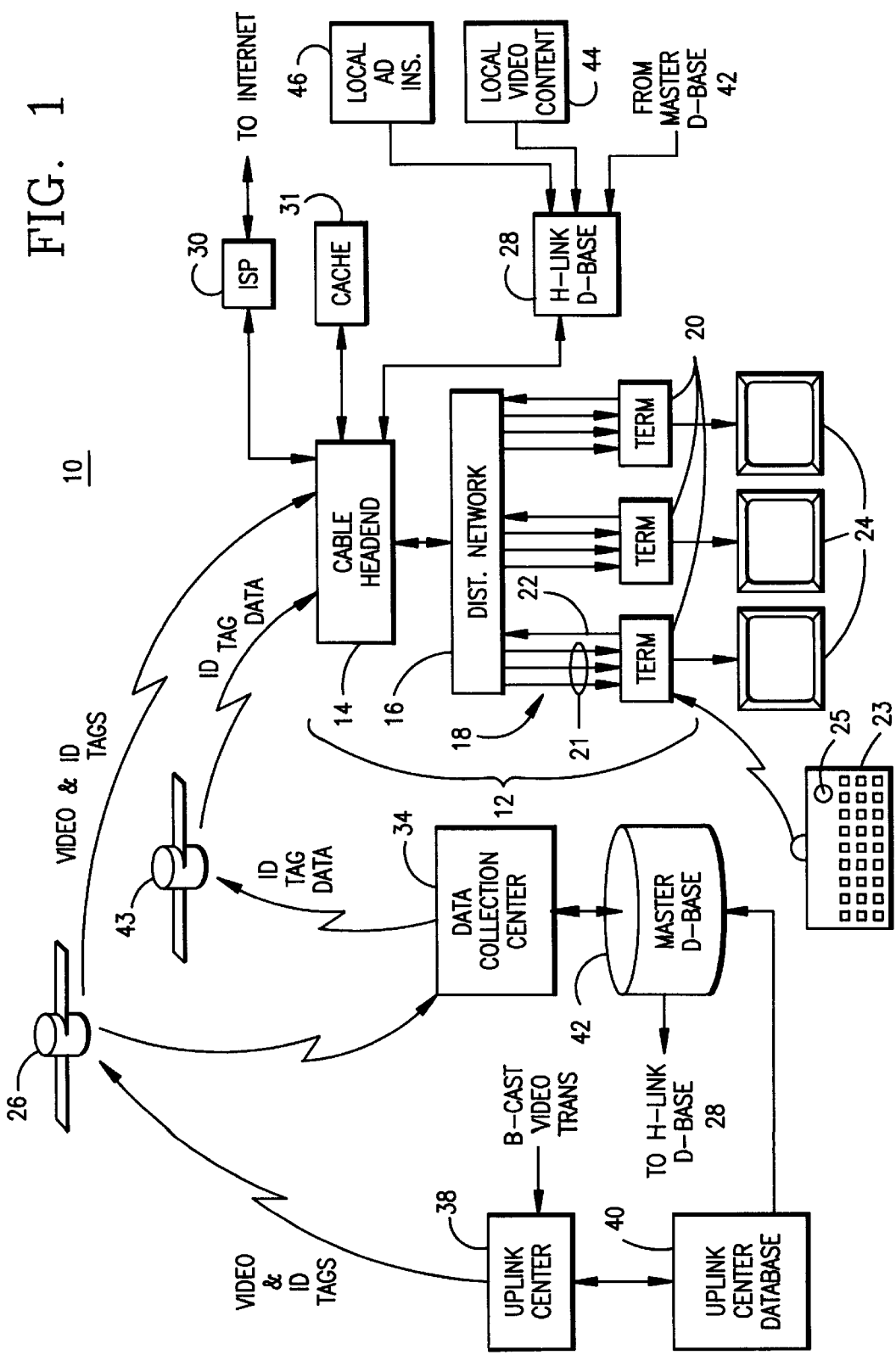
FIG. 1 is a schematic block diagram of a system constructed in accordance with a preferred embodiment of the present invention for linking television distribution system users to Internet based information which is related to the content of a viewed program.

With reference to FIG. 1, an information communication system 10 is illustrated for implementing the channel hyperlinking concept of the present invention in accordance with a preferred embodiment thereof. The system 10 includes a television distribution system 12 for distributing television and other programming to a plurality of system users. As is conventional, the distribution system 12 includes a network headend 14 for supplying programming through a distribution network 16. The distribution network 16 distributes the television programming through a plurality of transmission links 18 to a corresponding plurality of user terminals or set top converter boxes 20. Each of the transmission links 18 preferably includes a plurality of downstream channels 21, and at least one upstream channel 22. As is also conventional, each of the set top converter boxes 20 enables a user to select, via a remote control device 23, for example, one of the downstream channels 21 HAS to be viewed on a television 24. Preferably, the remote control device 23 comprises a computer style keyboard which communicates with the set top converter box 20 by means of a conventional infra-red wireless link. Additionally, a mouse type input device (not shown) may be used in conjunction with the keyboard 23 as is conventional. Alternatively, the remote control device 23 may also comprise a conventional television remote control.

Each of the communication links 18 preferably comprises a coaxial cable, however, it will be understood that other types of links, such as fiber optics and wireless links, for example, may be employed. The distribution network 16 supplies the video programming information for each of the plurality of downstream channels 21 to each of the set top converter boxes 20 by using a conventional digital or analog communication scheme. In contrast to conventional television distribution systems, however, the communication links 18 are preferably operated in a two-way manner in which at least one of the upstream channels 22 is provided for each set top converter box 20 to enable it to send information requests to the network headend 14 in real-time. This allows a user to request access to Internet-based or other information related to the currently viewed programming through actuation of a channel hyperlink button 25 on the keyboard 23.

The network headend 14 receives video programming to be distributed to the user from a satellite 26 as is conventional. In contrast to conventional television distribution systems, however, the headend 14 can also access information from one or more headend databases 28 (hereinafter referred to as the hyperlink database), and this information may be used to select the Internet or other information which can be downloaded to the set top converter boxes 20 for viewing on the user televisions 24. The information stored in the hyperlink database(s) 28 is reference information which is related in some manner to the programs and advertisements being broadcast through the distribution network 16 to the users. For example, the reference information preferably includes source, content, timing and duration information regarding each program or advertisement. In addition, a key piece of information will typically be a Uniform Resource Locator (URL) which is used to reference more detailed information associated with the content of the programs and advertisements being broadcast.

The programming content related information may be in any suitable form, such as text and associated graphics or pictures (e.g., Internet Web pages, full motion video, audio, etc.). Although the content related information may be from any source, it is preferable that at least some of the information be obtained from the Internet. This is preferably accomplished by interfacing the headend 14 to a conventional Internet Service Provider (ISP) 30. Although the headend 14 can access the information directly from the ISP 30 in real-time, it is preferable that the headend 14 access the information from the ISP 30 in advance of any information requests being received from the users, and stores or caches the information in a cache 31 interfaced between the ISP 30 and the headend 14 so that it may be quickly accessed and downloaded to a user in response to an information request.

To facilitate channel hyperlinking by a user from a video program or advertisement to related Internet-based or other information, some means must be provided for identifying to the network headend 14, the identity of the program which was being viewed at the instant that the user initiated the hyperlinking request. This is accomplished by having all sources of broadcast programming periodically insert an identification number or tag, hereinafter referred to as an ID tag, into the transmitted television signal approximately once every second. The ID tag identifies the programming content, and may also identify the company or organization originating the program or advertisement, as well as unique demographic or geographic information which identifies known geographic and demographic categories within a given country or market. As will be discussed in greater detail below, the headend 14 employs the ID tag to perform a table look up operation in the hyperlink database(s) 28 to retrieve the reference information (e.g., URLs) which is necessary to access the content related information from the ISP 30 and/or the cache 31.

A data collection center 34 is preferably provided which receives, monitors and collects broadcast programming via the satellite 26 from a plurality of broadcast and cable television network uplink centers 38 (only one shown in FIG. 1), each of which is operated by a corresponding broadcast or cable television network. The purpose of the uplink center 38 is not only to broadcast video programming via the satellite 26, but also to insert the ID tags in the video programming. In the case of analog television signals, this can be accomplished by inserting the ID tag in the vertical blanking interval (VBI) of the signal, or by inserting the tag in either the audio or live video stream. For digital communications, such as those based on the MPEG II format, for example, the ID tag data may be periodically (e.g., approximately once every second) inserted in a data stream associated with the particular video and audio data stream.

Each of the uplink centers 38 also preferably communicates with an uplink center database 40 which stores information relating to the programming or advertising content such as the URL or other Web based information to be associated with the programming or advertising content. The URL data in each of the uplink center databases 40 is preferably communicated via the Internet to a master database 42 which is interfaced to the data collection center 34. The master database 42 contains the URL and other reference data for all channel hyperlinks for the various national broadcast and cable TV networks. This information is then retransmitted, again preferably through the Internet, to each of the network headends 14 where the URL data is stored in the one or more hyperlink databases 28. Additionally, it should also be noted that although much of the URL data stored in the hyperlink database 28 will be the same as the corresponding data stored in the master database 42, there will be some differences in cases where the URLs or other Web data to be associated with an ID tag, as supplied by the programming source, are to be unique for a particular geographic or demographic location or market. For example, an ID tag for an advertised product may be linked to information pertaining to one supplier of the product in a first market area, and information pertaining to a second supplier in a second market area. The data collection center 34 thus manages the transmission of the URL data from the master database 42 to the hyperlink database 28 in accordance with any geographic or demographic identifiers that may be present in each ID tag. Also, the headend database 28 will likely contain only the information on ID tags for programming and advertising which may likely appear on the broadcast channels received by the headend 14, while the master database 42 will contain all such information.

The collection center 34 also combines all of the ID tags which are present in all of the television signals that are received from the satellite 26, and retransmits the ID tags as a combined data stream to a second satellite 43. The second satellite 43 transmits this combined ID tag data stream to each cable headend 14. Although the ID tags are obviously present in the video signals being received by the cable headend 14 from the first satellite 26, the separate transmission of the ID tags eliminates the need for the headend 14 to detect and remove the ID tags from the incoming video signals. Alternatively, however, it will of course be understood that the headend 14 can detect and remove the ID tags itself.

The hyperlink database 28 also preferably receives URL hyperlink data from a local video content source or database 44 which supplies information for national network local affiliates, community access, locals schools, and cable operator sponsored channels, for example. A source 46 of local advertising insertion is also provided for supplying local advertisement ID tags to each hyperlink database 28. The local ad insertion equipment informs the hyperlink database 28 in real-time of any ID tags when it is going to insert advertisements in the broadcast.

Figure 2:
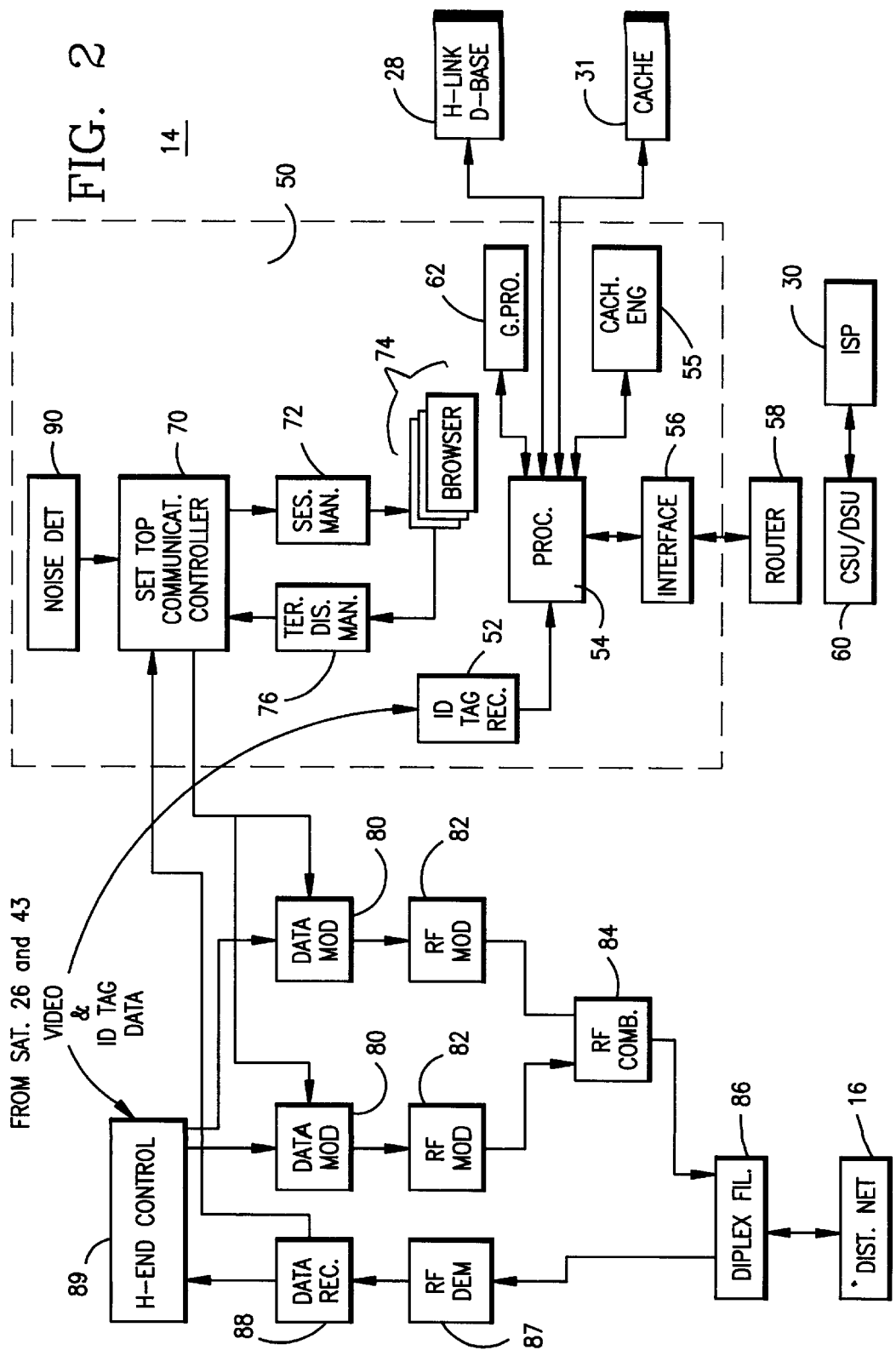
FIG. 2 is a schematic block diagram of a network headend employed in the system of FIG. 1.

FIG. 2 illustrates the details of the headend 14 in the preferred embodiment of the present invention which operates by supplying channel hyperlink and other Internet information to each user through insertion of the information in the downstream television signals. The heart of the headend 14 is a headend server 50 which manages accessing of channel hyperlink information from the ISP 30, hyperlink database(s) 28 and local database 44, storage of pre-cached channel hyperlink information in the cache 31, and reception of program content ID tag information from an ID tag receiving circuit 52. The headend server 50 includes a processor 54 for carrying out these operations. The processor 54 sends Internet information requests to, and receives requested information from, the ISP 30 by means of a number of conventional communications elements including a caching engine 55, an interface 56, a router 58 and a channel service unit/data service unit (CSU/DSU) 60. The caching engine 55 manages the predictive caching of HTML Web site hyperlink data from the ISP 30, and storage of this data in the cache 31. A conventional graphics processor 62 may also be provided, if necessary, for converting the graphics portion of the HTML data received from the ISP 30 into a graphics format which is compatible with the user television 24.

The channel hyperlink information requests are received from a user by a set top communications controller 70. These requests are forwarded to a session manager 72 which can manage multiple sessions from a plurality of the set top converter boxes 20, and maintains an association between the received request and the one of the converter boxes 20 which made the request. More particularly, each channel hyperlink information request received by the communications controller 70 includes an identification number or code which identifies the set top converter box 20 that sent the request. The session manager 72 keeps track of this information and will match the Internet information requested with the correct set top converter box 20 which submitted the request.

After a request is received from one of the set top converter boxes 20, the session manager 72 forwards the request to the processor 54, and connects the user to one of a plurality of active browser applications (browsers) 74. By providing a plurality of the browsers 74 which are actively running, but are not currently being used by any users, a user can be connected to the channel hyperlink information without the delays which are normally associated with the opening of a browser application. The session manager 72 monitors the number of available active browsers 74 as users are connected to the channel hyperlink information through the browsers 74, and the number of available active browsers decreases. Once this number reaches a predetermined minimum, e.g., 3, the session manager 72 causes a predetermined number, e.g., 5, of the browsers 74 to be reactivated to insure that an active browser will always be available when channel hyperlink information is requested to be accessed by a user. It should be understood that although the use of plural active browsers in the foregoing manner is preferred, it is not necessary to employ this feature to practice the present invention, and the browsers 74 could be opened in a conventional "as needed" manner if desired.

The channel hyperlink information is accessed by the browser application 74 from either the cache 31 or the ISP 30. The browser application 74 constructs the accessed information (e.g., Web page) into a bitmap which is preferably compressed to reduce transmission time between the headend 14 and the set top converter box 20. The compressed bitmap is then forwarded by the browser application 74 to a terminal display manager 76. Preferably, the terminal display manager 76 is designed to minimize further the actual amount of information that must be transmitted to the set top converter box 20. This is accomplished by transmitting to the set top converter box 20, only the information necessary to refresh portions of a display screen that are to be changed.

The set top communications controller 70 transmits the display information from the display manager 76 to a data modulator 80. In a preferred embodiment, the modulator 80 comprises a VBI data inserter. As the name implies, a VBI data inserter inserts the channel hyperlink related data into the vertical blanking interval of the video program currently being broadcast on the one of the downstream channels 21 on which the hyperlink data is to be downloaded. It should be noted that a plurality of the data modulators 80 is provided, one for each of the available downstream channels 21. Alternatively, this information, along with appropriate identifiers, is included as part of an elementary digital stream of data. Each downstream channel 21 also includes an RF modulator 82 for modulating each television signal to the appropriate channel frequency. An RF combiner 84 is provided which receives the outputs from all of the RF modulators 82 and combines them to form a single signal. This signal is then fed to a diplex filter 86, and finally to the distribution network 16.

The purpose of the diplex filter 86 is to separate upstream channel hyperlink information requests received from the users over the transmission link 18, from the downstream television signals. These upstream requests are fed from the diplex filter 86 to a plurality of RF demodulators 87, one for each upstream channel 22, and then to an upstream data receiver 88 which forwards the requests to the communications controller 70 for processing by the headend server 50. A network headend controller 89 includes equipment for receiving television broadcast transmissions from the second satellite 36, and distributing the transmissions over the respective downstream channels 21.

Preferably, a noise detector 90 is also provided in the communications controller 70 for detecting the noise level on each of the upstream channels 22. If the detected noise level is too high on one of the upstream channels 22, the communications controller 70 can re-assign each of the set top converter boxes 20 to another one of the upstream channels 22. Alternatively, the communications controller 70 can direct the affected ones of the set top converter boxes 20 to transmit at a higher level if necessary. Preferably, the noise detector 90 comprises software that determines noise levels by keeping statistics corresponding to the number of corrupted data packets received on each of the upstream channels 22.

Figure 3:
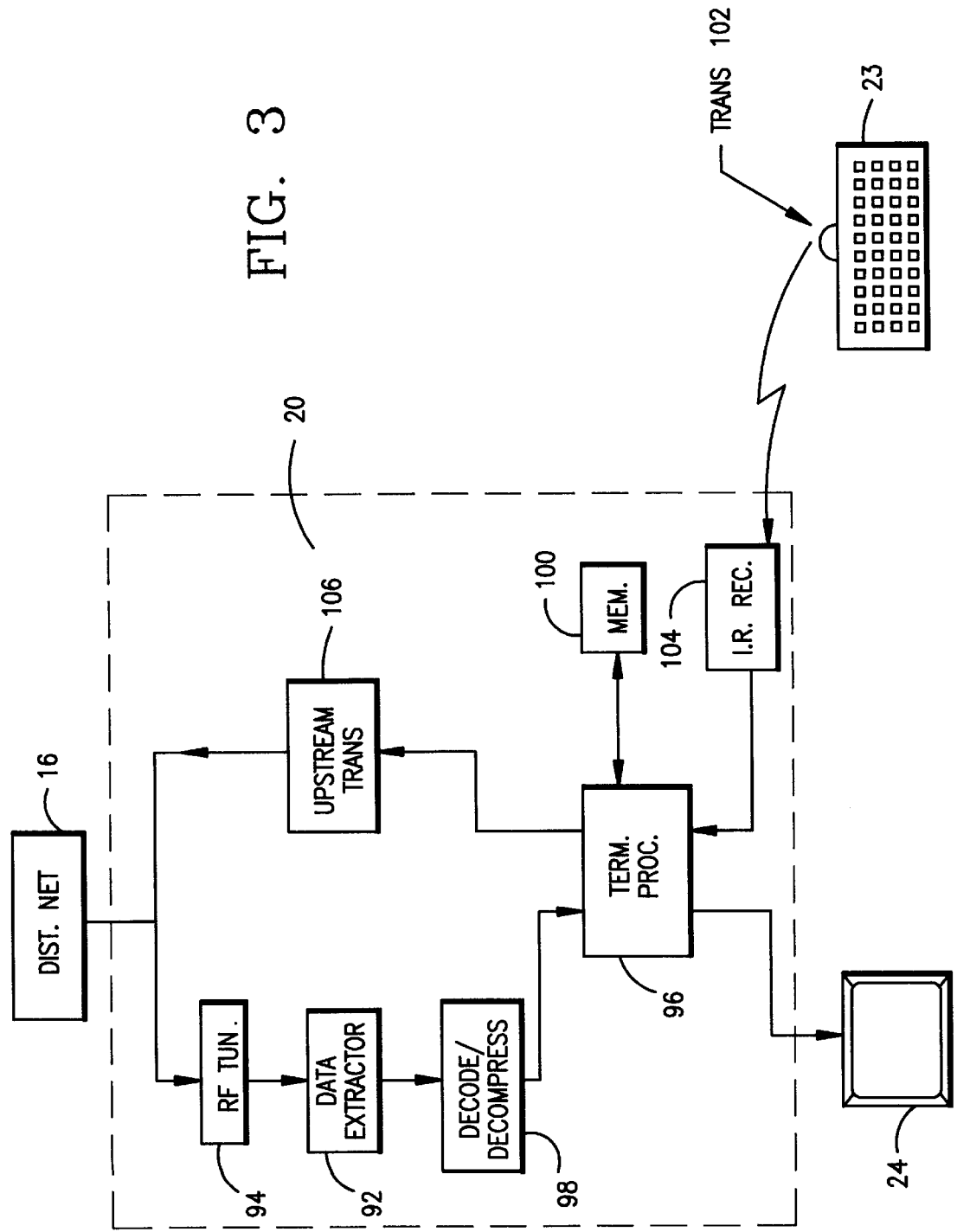
FIG. 3 is a schematic block diagram of a set top converter box circuit employed in the system of FIG. 1.

With reference now to FIG. 3, the circuitry contained in the set top converter box 20 is illustrated. In the preferred embodiment, downstream television signals received from the distribution network 16 are fed to a downstream data extractor 92 via an RF tuner 94. In the embodiment in which the data modulator 80 comprises a VBI inserter, the extractor 92 comprises a VBI extractor. As is conventional, the RF tuner 94 is controlled by the user to select and demodulate one of the downstream channels 21. Additionally, a set top or terminal processor 96 is provided which can also control the RF tuner 94 for selection, in response to information received from the communications controller 70, the one of the downstream channels 21 on which requested hyperlink information will be received. The extractor 92 removes the inserted channel hyperlinking information from the blank intervals of the video signal, and forwards it to the terminal processor 96. Preferably, the processor 96 also includes the software for performing the function of decoding and decompressing the video display data. Alternatively, the set top converter box 20 may include a decoding and/or decompression module 98 interposed between the extractor 92 and the processor 96 for performing this function.

The terminal processor 96 is interfaced to a memory bank or module 100 which facilitates the various processing functions performed by the processor 96, including production of the video display information from the extracted information, and display of the same on the television display screen 24. The terminal processor 96 also receives channel hyperlinking commands from a user via the keyboard 23. The remote control 23 preferably includes an IR transmitter 102 which communicates with an IR receiver 104 contained within the set top converter box 20. It will be of course understood that any other type of input arrangement, such as a hard wired keyboard or mouse, for example, could be employed for entering the channel hyperlink requests. The receiver 104 forwards the channel hyperlinking request to the terminal processor 96 which identifies the channel to which the RF tuner 94 is tuned. This information, along with the set top converter box identification number, is then forwarded by means of an upstream transmitter 106 through the transmission link 18 to the headend 14 for processing.

It should be understood that while one embodiment of the invention is specifically designed for use with analog video signals in which the channel hyperlink information is inserted into the vertical blanking intervals of the analog video signals, the information could also be inserted into the horizontal blanking intervals and/or the video and audio streams if desired. Such alternative arrangements would be useful, for example, for increasing the transmission rate of the channel hyperlink information. Further, it would be a simple matter to implement the present invention using an all digital format, such as MPEG II, for example. In such an arrangement, the data modulator 90 and extractor 92 would be implemented by a corresponding digital data inserter and extractor which are compatible with the selected digital format.

The transmission of upstream and downstream data between the set top converter box 20 and the communications controller 70 of the headend server 50 will now be described with reference to FIGS. 4–7. Preferably, each upstream channel 22 of the television distribution network 12 is multiplexed into a plurality of upstream slots, where the temporal length T of each slot is equal to the temporal length T of a single picture field in the downstream video signals, where each picture field includes a picture interval and a vertical blanking interval. In the USA broadcasting convention, T equals 1/60th of a second. Also preferably, a plurality of the upstream channels 22 are paired with each downstream channels 21. In the preferred embodiment of the present invention, up to four upstream channels are paired with each downstream channel. Also preferably, each set top converter box 20 in the system 10 is assigned to at least one of the upstream slots at any one time.

Figure 4:
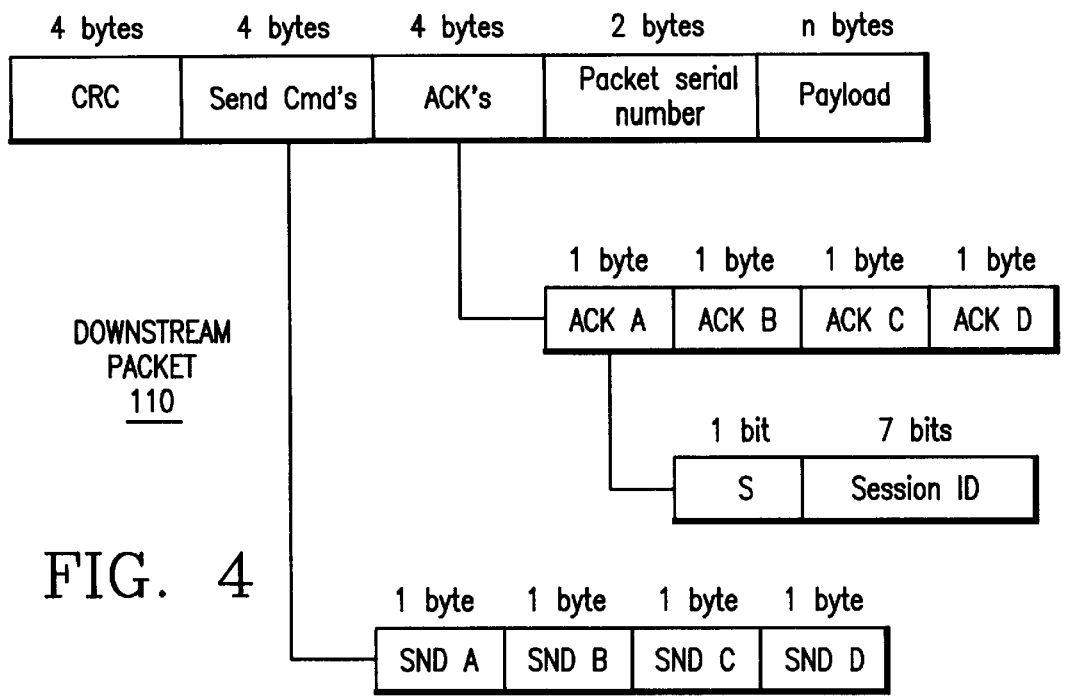
FIG. 4 is a diagram of a downstream packet transmitted on one of the system's downstream channels.

Preferably, and referring now to FIG. 4, each transmission of downstream data from the communications controller 70 of the headend server 50 is in the form of at least one downstream packet 110. As illustrated, the downstream packet 110 includes a four-byte cyclical redundancy check (CRC) value based on the rest of the downstream packet 110, where the CRC value is employed to detect any corruption of the data in the packet 110. The use of CRC values is well-known and, therefore, need not be further described.

The downstream packet 110 also includes four SND bytes (SND A–SND D), where each SND byte corresponds to an upstream channel associated with the downstream channel on which the downstream packet 110 is being sent. Each SND byte contains a session ID of a sender (i.e., a set top converter box 20) that is allowed to transmit upstream data in the next upstream slot of the corresponding upstream channel. For example, if the SND B byte has a value of '1', then the set top converter box 20 assigned the session ID '1' may transmit in the next upstream slot on the upstream channel that corresponds to 'B'. Preferably, if a particular SND byte has a value of zero, any set top converter box 20 is allowed to transmit in the next corresponding upstream slot, for example, to request a new session.

Each downstream packet 110 also has four acknowledgment (ACK A–ACK D) bytes, where each ACK byte corresponds to an upstream channel associated with the downstream channel on which the downstream packet 110 is being sent. As should be understood, each ACK byte is sent in response to the successful receipt of upstream data on a respective upstream channel in the previous upstream slot. Preferably, each ACK byte includes the session ID of the transmitting set top converter box 20 and a check bit indicating whether the serial number of the upstream packet being acknowledged was an even or an odd number.

Figure 5A:
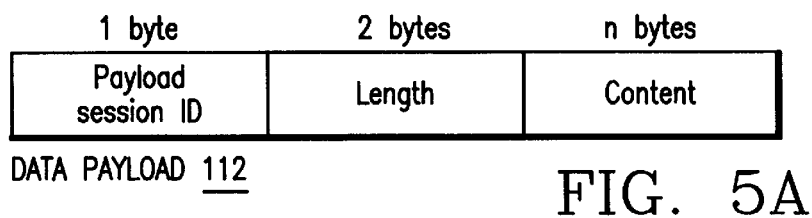
FIGS. 5A and 5B are diagrams of payloads that can be sent in the downstream packet shown in FIG. 4.

Referring now to FIG. 5A, the downstream packet 110 also has a two-byte packet serial number, followed by a multi-byte downstream data payload 112. The downstream data payload 112 includes a one-byte payload session ID for identifying the session ID of the intended receiving set top converter box 20 for the payload, a two-byte length indicator, and the contents of the data being sent in the packet. As should be understood, although all of the set top converter boxes 20 on the downstream channel will receive all downstream packets 110, a particular set top converter box 20 will ignore the contents of the data being sent in the packet 110 unless the data payload 112 has a payload session ID corresponding to the session ID of the set top converter box 20.

Figure 5B:
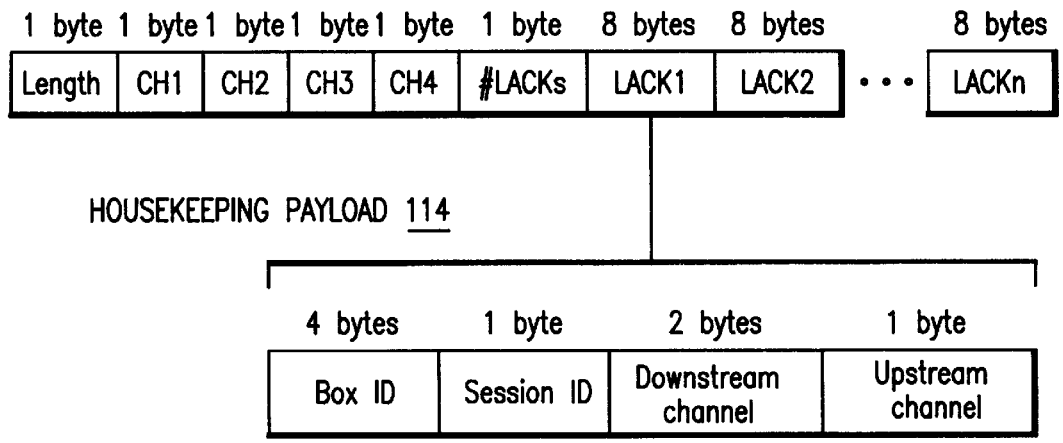

Preferably, a downstream packet 110 periodically has a housekeeping payload 114 rather than a data payload 112, as illustrated in FIG. 5B. As illustrated, the housekeeping payload 114 includes four channel bytes, each channel byte identifying a respective one of the four upstream channels 22 associated with the one of the downstream channels 21 on which the downstream packet 110 is being sent. Accordingly, if a set top converter box 20 wishes to transmit a channel hyperlink request, the set top converter box 20 must listen on the downstream channel for a housekeeping packet 114, and upon receipt of such housekeeping packet can determine what upstream channels are associated with the downstream channel. The set top converter box 20 can then send a hyperlink request on one of the associated upstream channels 22.

If hyperlink requests were recently made and acted upon by the communications controller 70, the housekeeping payload 114 also includes a number of hyperlink request acknowledgments (ACKs). In particular, the housekeeping payload 114 includes a one-byte indicator of the number of ACKS, followed by each ACK. Each ACK includes a 'box ID' corresponding to a unique terminal ID number associated with a requesting set top converter box 20, a one-byte session ID that identifies the requesting set top converter box 20 during the channel hyperlink session, a two-byte downstream channel indicator indicating the one of the downstream channels 21 that the requesting set top converter box 20 should tune in to, and a one-byte upstream channel indicator indicating the upstream channel 22 on which the set top converter box 20 should be broadcasting.

Figure 6:
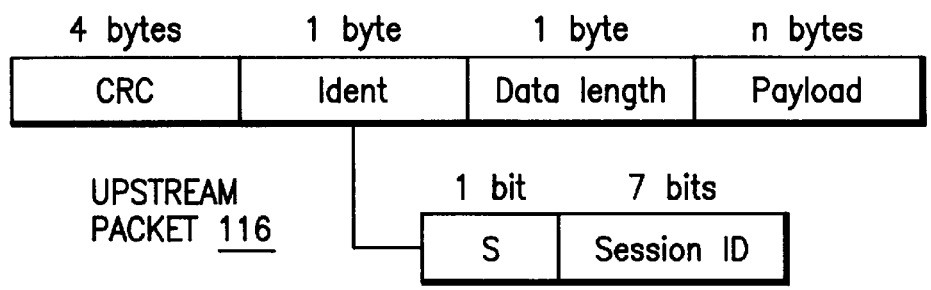
FIG. 6 is a diagram of an upstream packet transmitted on one of the system's upstream channels.
Figure 7A:
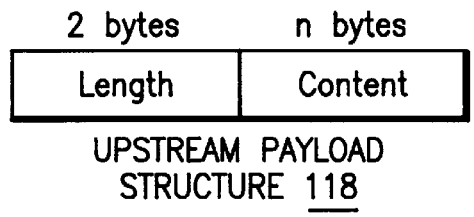
FIGS. 7A–7F are diagrams of payloads that can be sent be sent in the upstream packet shown in FIG. 6.

Referring now to FIG. 6, upstream data from the set top converter box 20 is sent in the form of an upstream packet 116. As illustrated, each upstream packet 116 includes a 4-byte CRC value, as with each downstream packet 110, a one-byte identifier which has the session ID assigned to the set top converter box 20 and a check bit indicating whether the upstream packet 110 has an even or an odd packet number, a one-byte data length indicator indicating the length of a multi-byte upstream payload in the packet 116, and the payload. As illustrated in FIG. 7A, the upstream payload has a structure 118 that includes a two-byte length indicator and the contents of the payload. FIGS. 7B–7F are examples of the contents of various upstream payloads.

Figure 7B:
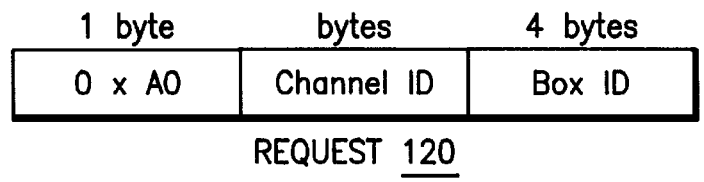

As illustrated in FIG. 7B, a channel hyperlink request 120 from a set top converter box 20 includes a one-byte indicator signifying that the upstream packet 116 is a hyperlink request 120, a two-byte indicator identifying the TV channel that the set top converter box 20 is currently tuned to, and a four-byte indicator identifying the unique box ID of the requesting set top converter box 20. Upon receipt of the channel hyperlink request in 20, the headend server 14 determines the time of the request from a real-time system clock. The time and TV channel number are then used by the headend server 14 to access the hyperlink database 28 to locate the appropriate URL.

Figure 7C:
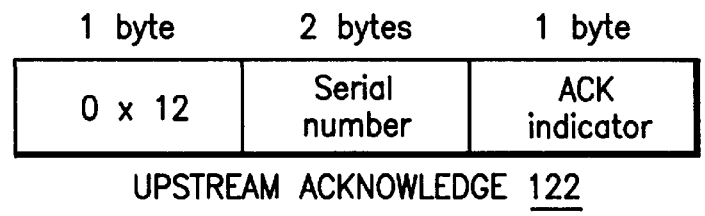

As illustrated in FIG. 7C, an upstream acknowledge payload 122 includes a one-byte indicator signifying that the upstream packet 116 is an upstream acknowledge 122, a two-byte serial number of the downstream packet 110 that is being acknowledged, and a one-byte acknowledge (ACK) indicator.

Figure 7D:
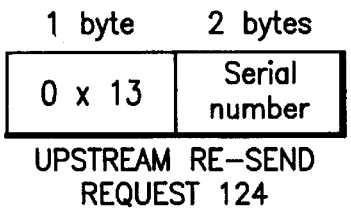

On occasion, an expected downstream data packet 110 is not received, or else is received with a corruption or error. Accordingly, and as illustrated in FIG. 7D, an upstream packet 116 may have an upstream re-send request payload 124 which includes a one-byte indicator signifying that the upstream packet 116 is a re-send request 124, and a two-byte serial number of the downstream packet 110 that must be re-sent.

Figure 7E:
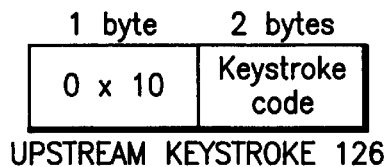

If the data being sent upstream by the set top converter box 20 is a keystroke from a computer-style keyboard or the like, then the upstream packet 116 has an upstream keystroke payload 126, as illustrated in FIG. 7E, which includes a one-byte indicator signifying that the upstream packet 116 is a keystroke payload 126, and a two-byte keystroke code. As should be understood, if the keystroke is from a keyboard, the keystroke code includes information on whether a CTRL/ALT/SHIFT key is being pressed at the time a key is struck.

Figure 7F:
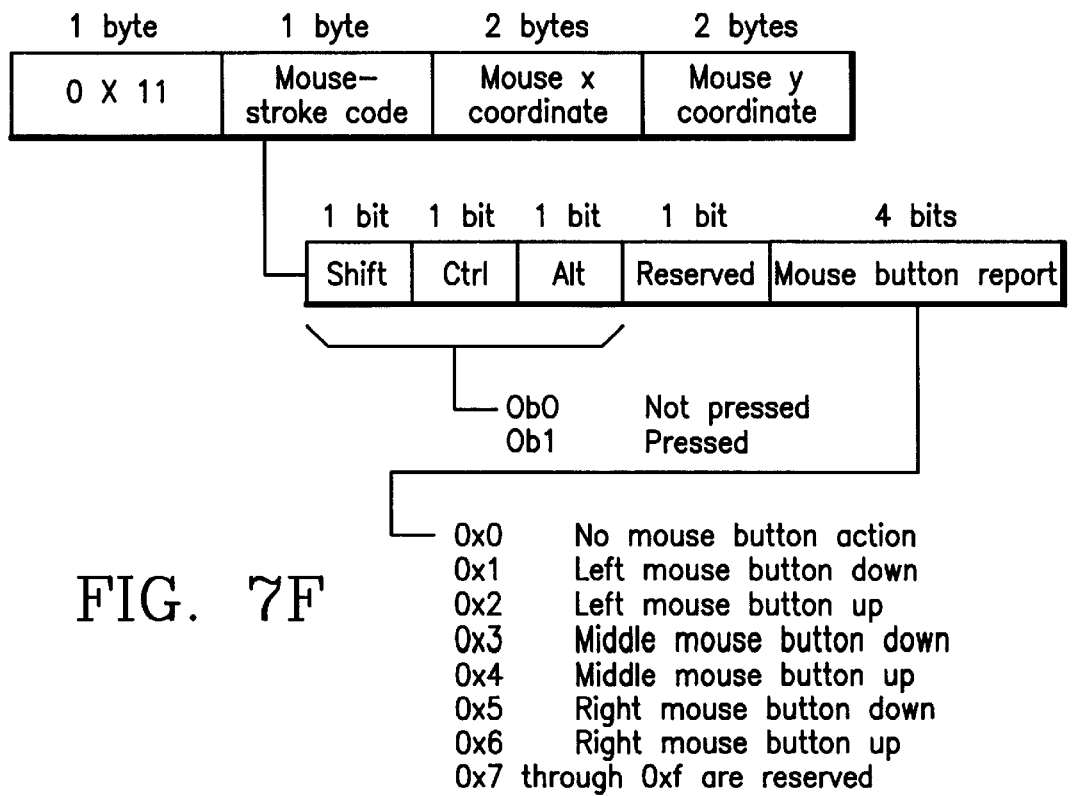

If a mouse or mouse-like device is employed by a user as an input device, mouse movements are input to the set top converter box 20 and the system 10 as commands. Accordingly, an upstream packet 116 may have upstream mouse movement information 128, as illustrated in FIG. 7F. The mouse movement information 128 includes a one-byte indicator signifying that the upstream packet 116 is a mouse movement payload 128, a one-byte mouse-stroke code, a two-byte mouse X-coordinate, and a two-byte mouse Y-coordinate. As should be understood, the one-byte mouse-stroke code includes information on whether a SHIFT/CTRL/ALT key is being pressed, and left, middle and right mouse button information.

As one skilled in the art will readily appreciate, the particular structures of the downstream and upstream packets 110, 116 may be changed without departing from the spirit and scope of the present invention. For example, if only three upstream channels are assigned to a downstream channel, only three SND and three ACK bytes are necessary in the downstream packet 110 (FIG. 4). Similarly, fields in the packets 110, 116 may be added, deleted or changed in terms of structure or size.

As should be understood, due to the structure of a typical television distribution network, noise on upstream channels is problematic. As a result, it is known that upstream channels can have error rates as high as 1:100000 to 1:100. Accordingly, it is preferable that upstream data packets 116 are kept relatively short to lessen the probability that any one packet will be corrupted by noise. It should be noted, however, that such short upstream packets 116 are not prohibitive in that most upstream commands are relatively short: a mouse movement, a keystroke, etc.

With the system 10 as described above, a set top converter box 20 generates a channel hyperlink request in the following manner. Preliminarily, the set top converter box 20 is tuned into one of the downstream channels 21 on which downstream packets 110 are being sent, and listens for a housekeeping packet 114 to determine which upstream channels 22 are associated with the downstream channel 21. A random one of the upstream channels 22 is selected, and a hyperlink request 120 is sent in an upstream slot that has not been preassigned by a respective SND byte. If a hyperlink request acknowledge (ACK) is subsequently received within a pre-determined number of time periods T (corresponding to the length of a picture field and to the length of an upstream slot), the hyperlink request has been successfully received. If not, new random downstream and upstream channels 21 and 22 may be tried.

In the unlikely event that two set top converter boxes 20 send a hyperlink request in the same upstream slot, the communications controller 70 will receive collided data and neither set top converter box 20 will receive an ACK. Preferably, each set top converter box 20 then waits a random amount of time and attempts a second hyperlink request. The process is repeated until both hyperlink requests are handled by the communications controller 70.

Once receipt of the hyperlink session request is acknowledged, the set top converter box 20 waits for a downstream packet 110 that has been addressed to the set top converter box 20 in response to the request. Preferably, each received downstream packet 110 is checked to determine if the packet serial number is correct. If the packet serial number is wrong, a re-send request 124 is sent with the packet serial number of the last packet that was successfully received. Preferably, the headend server 50 interprets a re-send request 124 as a request to re-send the packet 110 having the re-send serial number and every packet 110 sent thereafter.

If a re-send request 124 is sent multiple times without result, or if a downstream packet 110 has not been received by the set top converter box 20 in a predetermined period of time, the set top converter box 20 can attempt a re-connect. Preferably, in a re-connect attempt, the set top converter box 20 makes a hyperlink session request 120 on a new one of the upstream channels 22, and the communications controller 70 responds on a different one of the downstream channels 21.

As was discussed above, each downstream packet 110 and upstream packet 116 is quickly acknowledged (ACKed) by the packet recipient, as illustrated in FIGS. 4 and 7C. As should be understood, such quick ACKs are necessary to address the problem of noise and to provide real-time access to the ISP 30. Preferably, a packet sender waits for up to two upstream slots or picture fields to receive an ACK from a packet recipient. If an ACK is not received in this time by a set top converter box 20, the set top converter box 20 preferably re-sends the upstream packet 116 for which acknowledgment is sought. If a set top converter box 20 is forced to re-send data a predetermined number of times, a re-connect attempt is preferably made on new ones of the downstream and upstream channels 21 and 22.

In the operation of the channel hyperlinking system 10, each of the headends 14 preferably pre-caches from the ISP 30, the HTML data pertaining to the channel hyperlinks associated with upcoming programming prior to the broadcasts, and stores this information in the cache 31. As the video programs are received from the satellite 26 and the ID tag data stream is received from the second satellite 43, the headend 14 collects the hyperlink ID tags from the data stream, thereby reducing the hardware costs at the headend 14. At any given instant, the headend 14 can therefore identify the program content of any channel. The headend 14, upon receiving the URL data from the master database 42, can also retrieve the Web information located at the URL address from the ISP 30. As discussed previously, while it is preferable that this procedure be carried out in advance of a video broadcast to facilitate faster processing of hyperlink requests, this process can also be done in real-time if necessary.

If a user viewing a program or advertisement on channel A, for example, wishes to obtain additional information related to the advertised product or television program, the user presses the channel hyperlink button 25 on the keyboard 23 to initiate the request. The terminal processor 96 in the set top converter box 20 receives the request, and forwards it along with the channel and converter box identification information to the headend 14 for processing.

When the headend 14 receives the channel hyperlink information requests from the user, the communications controller 70 sends the channel ID information to the terminal processor 96 which identifies the one of the downstream channels 21 on which the requested channel hyperlink information will be transmitted. In response, the terminal processor 96 instructs the RF tuner 94 to switch to the designated channel. The session manager 72 then connects the user to one of the available active browsers 74, and the headend processor 54 uses the channel and request time information to perform a look up operation in the hyperlink database 28. In this example, the processor 54 accesses the HTML data from the cache 31 which corresponds to the URL information identified by the hyperlink ID tag for channel A at the exact time that the hyperlink request was made. The HTML data is then downloaded by the browser 74 to the user on the selected downstream channel for display on their television 24. If the plural active browsers and pre-caching features of the invention are employed, this entire process from actuation of the hyperlink button 25 to display of the downloaded information on the user television 24 should take only a few seconds by virtue of the fact that the user is quickly connected to an active browser application, and the downloaded Internet-based hyperlink information has already been pre-cached in the cache 31.

Once the user is finished browsing the downloaded information, they either actuate the hyperlink button 25 on the keyboard 23 for closing the Web page, or if they are using a mouse-type input device, they point and click on a back or exit button on the television display screen. In response, the session manager 72 closes the browser application 74 which has been delegated to the user, and the terminal processor 96 switches the tuner 94 back to the previously selected channel so that the user may resume viewing the video broadcast.

In summary, the present invention provides a convenient, user-friendly means by which a user can quickly access Internet-based, or other, information which is related to the programming content of a currently viewed television broadcast, and can view the information on their television without the need for an expensive computer system or the necessary skills for operating such a system. It should be understood that while the preferred embodiment of the present invention is designed specifically for accessing programming content related Internet-based information in a cable or other television distribution system, the inventive channel hyperlinking concept embodied in the preferred embodiment could be applied to any type of communication medium in which one or more information containing transmission signals are broadcast and received by one or more users, and the users can initiate hyperlink requests to access other information which is related to the information contained in the transmission signals. For example, the hyperlinking concept could also be applied to radio broadcasts in which a user, employing a personal computer or the like, could hyperlink to Internet-based or other information pertaining to a currently received radio broadcast. Similarly, the hyperlinking concept could be applied to pager signal distribution systems wherein, upon reception of a predetermined pager signal, a user could hyperlink to an information source containing pertinent information which the transmitter of the pager signal wants the receiver to access.

In view of the foregoing, it will therefore be understood that the scope of the invention as defined in the following claims is not limited to the preferred embodiment, and that the above and numerous additional variations and modifications could be made thereto without departing from the scope of the invention as defined in the following claims.

We claim:

1. A system for use in connection with a transmission signal for providing access to information from an information source, the content of which is related to the information content of the transmission signal, said system comprising:
   a) an information source;
   b) a plurality of terminals, each said terminal including;
      1) a receiver for receiving information from said information source and a transmission signal from a transmission signal source;
      2) means for generating a request for information to be received from said information source, said request including identification information for the transmission signal being received at the time of said request; and
      3) means for transmitting said request for information; and
   c) a network for receiving information from said information source and said transmission signal from a transmission signal source, and distributing said information to a receiver of one of said terminals transmitting a request for information, and distributing said transmission signal to said plurality of terminals, said network including;
      1) a receiver for receiving requests for information from said terminals; and
      2) means responsive to receipt of said request for information from said first terminal, and employing said transmission signal identification information for accessing information in said information source, the content of which is related to the information content of said transmission signal at the time said request is generated; and
      3) means for transmitting said related information to said first terminal.

2. The system of claim 1, wherein said information source comprises a cache interfaced to said network.

3. The system of claim 1, wherein said information source further comprises the Internet, and said network further includes means for accessing information from the Internet through an Internet Service Provider (ISP).

4. The system of claim 3, wherein said network further includes means for accessing information from the Internet through said ISP which is related to the information content of a transmission signal to be broadcast to said terminals by said network, and storing said information in a cache interfaced to said network for future access in response to information requests received from said terminals during broadcast of said transmission signal.

5. The system of claim 1, wherein said transmission signal includes an identification tag which is periodically transmitted with said transmission signal, and identifies the current programming content of said transmission signal, said identification tag being employed by said network to identify, in response to a received information request, information in said information source which is related to the information content of a transmission signal being received by one of said terminals when said terminal generates an information request.

6. The system of claim 5, wherein said identification information for the transmission signal being received at the time said request is generated comprises information identifying a receiver channel to which said receiver in said first terminal is tuned at the time said request is generated, wherein said network employs said channel identification information, said identification tag and timing information identifying the time at which said request is generated, to determine the information content of the transmission signal received by said terminal at the time that the information request is generated thereby.

7. The system of claim 6, further including a database interfaced to said network for storing reference information corresponding to said identification tag which identifies the location in said information source of information related to the information content of said transmission signal.

8. The system of claim 7, further including a master database for receiving and storing reference information for a plurality of broadcast transmission signals which identifies the location in said information source of information related to the information content of each said broadcast transmission signal, and means for transmitting information in said master database to said network database.

9. The system of claim 8, wherein said reference information in said master database includes Uniform Resource Locators (URLs) for Internet locations containing information which is related to the information content of each said broadcast transmission signal.

10. The system of claim 9, wherein said information source includes a cache interfaced to said network for storing HTML data for information accessed from the Internet at locations specified by said URLs.

11. The system of claim 5, further including means for inserting said identification tag in a signal to be transmitted prior to transmission thereof and transmitting said signal to said network receiver.

12. The system of claim 11, further comprising a data collection center, said data collection center including:
 1) means for receiving a plurality of transmission signals;
 2) means for removing identification tags from each of said transmission signals; and
 3) means for transmitting said identification tags to said receiver in said network.

13. The system of claim 8, wherein said master database further includes a plurality of different information location identifiers for said identification tag, each of which identifies demographic specific information in said information source that is related to the programming content of said transmission signal, and said means for transmitting information in said master database to said network database includes means for identifying information location identifiers in said master database which match demographics corresponding to said network, and transmitting only those information location identifiers to said network database.

14. The system of claim 1, wherein said information source comprises the Internet, and said network includes a browser application for use by one of said terminals requesting information to access and browse information from the Internet through an Internet Service Provider (ISP).

15. The system of claim 14, wherein said network further includes a plurality of said browser applications, and means for maintaining a number of said browser applications in an active state prior to receiving an information request from one of said terminals, whereby one of said active browser applications can be immediately employed by one of said terminals for accessing information from the Internet through said ISP.

16. The system of claim 1, wherein said transmission signal comprises a television broadcast signal, and said information source contains information related to the programming content of said television broadcast signal.

17. The system of claim 16, wherein said plurality of terminals and said network are disposed in a television distribution system.

18. The system of claim 17, wherein said television distribution system is a cable television distribution system.

19. The system of claim 1, wherein said request for information further includes information identifying said first terminal, and said network further includes means responsive to said information identifying said terminal, for causing said means for transmitting to transmit said content related information only to said first terminal that transmitted said request.

20. A system for providing access to the Internet through a television distribution network comprising:
 a) a source of Internet based information;
 b) a plurality of terminals, each said terminal interfaced to a television signal receiving device and including;
  1) a multiple channel receiver for receiving Internet based information from said information source and a plurality of broadcast television transmission signals on a corresponding plurality of channels;
  2) means for generating a request for information to be received from said information source, said request including identification information for the transmission signal being received at the time of said request; and
  3) means for transmitting said request for information; and
 c) a network for receiving Internet based information from said information source and said transmission signals from at least one broadcast television transmission signal source, and distributing Internet based information from said information source to a receiver of one of said terminals transmitting a request for Internet based information and distributing said broadcast television transmission signals from said signal source on a plurality of channels to said plurality of terminals, said network including;
  1) a receiver for receiving requests for Internet based information from said terminals; and
  2) means responsive to receipt of a said request for Internet based information from said first of said terminals, and employing said transmission signal identification information for accessing Internet based information in said information source which is related to the information content of a first of said broadcast transmission signals being received by said first of said terminals at the time said request for Internet based information is generated, and;
  3) means for transmitting to said first terminal for reception by said television signal receiving device, Internet based information which is related to the information content of said first of said broadcast television transmission signals at the time said request is generated by said first terminal.

21. The system of claim 20, wherein said network further includes means for accessing information from the Internet through an Internet Service Provider (ISP).

22. The system of claim 21, wherein said network further includes means for accessing information from the Internet through said ISP which is related to the information content of a plurality of television transmission signals to be broadcast to said terminals by said network, and storing said information in a cache interfaced to said network for future access in response to information requests received from said terminals during broadcast of said television transmission signals.

23. The system of claim 20, wherein each of said television transmission signals includes an identification tag which is periodically transmitted with each said television transmission signal and identifies the current programming content of said transmission signal, said identification tag being employed by said network to identify, in response to a received information request, Internet based information which is related to the information content of one of said television transmission signals being received by one of said terminals when said terminal generates an information request.

24. The system of claim 23, wherein said identification information for the transmission signal being received at the time of said request comprises information identifying a receiver channel to which said terminal receiver is tuned at the time of said request, wherein said network employs said channel identification information, said identification tag and timing information identifying the time at which said request is generated, to determine the information content of the transmission signal received by said terminal at the time that the information request is generated thereby.

25. The system of claim 24, further including a database interfaced to said network for storing reference information corresponding to said identification tag which identifies the location in said information source of information related to the information content of said television transmission signal.

26. The system of claim 25, further including a master database for receiving and storing reference information for a plurality of broadcast television transmission signals which identifies the location in said information source of information related to the information content of each said broadcast television transmission signal, and means for transmitting information in said master database to said network database.

27. The system of claim 26, wherein said reference information in said master database includes Uniform Resource Locators (URLs) for Internet locations containing information which is related to the information content of each said broadcast television transmission signal.

28. The system of claim 27, wherein a cache is interfaced to said network for storing HTML data for information accessed from the Internet at locations specified by said URLs.

29. The system of claim 23, further including means for inserting said identification tag in a signal to be transmitted prior to transmission thereof and transmitting said signal to said network receiver.

30. The system of claim 29, further comprising a data collection center, said data collection center including:
1) means for receiving a plurality of transmission signals;
2) means for removing identification tags from each of said transmission signals; and
3) means for transmitting said identification tags to said receiver in said network.

31. The system of claim 26, wherein said master database further includes a plurality of different information location identifiers for said identification tag, each of which identifies demographic specific information in said information source that is related to the programming content of said transmission signal, and said means for transmitting information in said master database to said network database includes means for identifying information location identifiers in said master database which match demographics corresponding to said network, and transmitting only those information location identifiers to said network database.

32. The system of claim 20, wherein each of said terminals includes means for a user to enter a request for Internet based information which is related to the information content of a television broadcast currently being viewed by said user on said television signal receiving device.

33. The system of claim 32, wherein said means for a user to enter a request comprises a button on a remote control device.

34. The system of claim 20, wherein said means in said network for transmitting said Internet based information comprises a data modulator for inserting said information in a television transmission signal being broadcast by said network on one of said receiver channels in said first terminal.

35. The system of claim 34, wherein said data modulator comprises a vertical blanking interval inserter for inserting said information in the vertical blanking intervals of said television transmission signal.

36. The system of claim 20, wherein said request for information further includes information identifying said first terminal, and said network further includes means responsive to said information identifying said terminal, for causing said means for transmitting to transmit said content related information only to said first terminal that transmitted said request.

37. A method for accessing transmission signal content related information from an information source, said method comprising the steps of:
 a) providing a terminal, said terminal including a receiver for receiving a transmission signal and a transmitter for sending a request for information;
 b) providing a transmission signal distribution network for receiving a transmission signal from a signal source and broadcasting said transmission signal to said terminal receiver;
 c) providing an information source interfaced to said network, said information source containing information related to the information content of said transmission signal;
 d) transmitting said transmission signal from said network to said terminal receiver;
 e) generating a request at said terminal for information related to the information content of said transmission signal during reception thereof said request including identification information for said transmission signal being received at the time of said request, and transmitting said request to said network;
 f) in response to reception of said request from said terminal, said network:
  1) identifying information in said information source which is related to the information content of said transmission signal;
  2) accessing said content related information; and
  3) transmitting said content related information to said terminal.

38. The method of claim 37, wherein said step of said network accessing said information further comprises accessing said information from the Internet through an Internet Service Provider.

39. The method of claim 38, wherein said step of said network accessing said information further comprises:
 a) before said transmission signal is transmitted to said terminal receiver, accessing information from the Internet through an Internet Service Provider which is related to the information content of said transmission signal;
 b) storing said related information in a cache interfaced to said network; and c) accessing said related information from said cache when said information request is received.

40. The method of claim 37, wherein said step of said network identifying information in said information source which is related to the information content of said transmission signal, further comprises:
   a) determining from 1) said transmission signal identification information 2) an identification tag periodically transmitted with said transmission signal by said signal source that identifies the current programming content of said transmission signal, and 3) information identifying the time at which said request is made, the identity of the information content of said transmission signal being received by said terminal at the time said request for information is generated thereby; and
   b) matching said identification tag with reference information identifying the location of said content related information in said information source, said reference information being stored in a network database accessed by said network.

41. The method of claim 40, wherein said transmission signal identification information comprises channel identification information identifying a channel to which said terminal receiver is tuned, said network employing said channel identification information with said identification tag and time of request information to determine the information content of the transmission signal being received by said terminal at the time said request is generated.

42. The system of claim 40, further comprising the steps of generating a master database of reference information for a plurality of broadcast transmission signals which identifies the location in said information source of information related to the information content of each said broadcast transmission signal, and transmitting information in said master database to said network database.

43. The method of claim 42, wherein said reference information in said master database includes Uniform Resource Locators (URLs) for Internet locations containing information which is related to the information content of each said broadcast transmission signal.

44. The method of claim 43, wherein said step of said network accessing said content related information further comprises accessing HTML data from the Internet at locations specified by said URLs.

45. The method of claim 40, further comprising the steps of:
   1) receiving a plurality of transmission signals at a data collection center;
   2) removing identification tags from said transmission signals; and
   3) transmitting said identification tags to said network receiver.

46. The method of claim 42, further comprising the steps of:
   1) providing in said master database, a plurality of different information location identifiers for said identification tag, each of which identifies demographic specific information in said information source that is related to the programming content of said transmission signal;
   2) identifying information location identifiers in said master database which match demographics corresponding to said network; and
   3) transmitting only those information location identifiers to said network database.

47. A method for accessing broadcast television transmission signal content related information from the Internet, said method comprising the steps of:
   a) providing a plurality of terminals, each said terminal being interfaced to a television transmission signal receiving device, and including a multiple channel receiver for receiving a transmission signal and a transmitter for sending a request for Internet based information which is related to the information content of a currently received television transmission signal;
   b) providing a television transmission signal distribution network for receiving a plurality of broadcast television transmission signals from at least one signal source and transmitting said television transmission signals to said terminal receivers;
   c) providing an information source interfaced to said network, said information source containing Internet based information related to the information content of said television transmission signals;
   d) transmitting said television transmission signals from said network to said terminal receivers;
   e) generating at least a first request at a first of said terminals for information related to the information content of one of said television transmission signals during reception by said first terminal, said request including identification information for said transmission signal being received at the time of said request and transmitting said request to said network;
   f) in response to reception of said request from said first terminal, said network:
      1) identifying Internet based information in said information source which is related to the information content of said television transmission signal;
      2) accessing said content related information; and
      3) transmitting said content related information to said first terminal.

48. The method of claim 47, wherein said step of said network accessing said information further comprises accessing said information from the Internet through an Internet Service Provider.

49. The method of claim 48, wherein said step of said network accessing said information further comprises:
   a) before said television transmission signals are transmitted to said terminal receivers, accessing information from the Internet through an Internet Service Provider which is related to the information content of said television transmission signals;
   b) storing said related information in a cache interfaced to said network; and
   c) accessing said related information from said cache when said information request is received.

50. The method of claim 47, wherein said step of said network identifying information in said information source which is related to the information content of said television transmission signal, further comprises:
   a) determining from 1) said transmission signal identification information 2) an identification tag periodically transmitted with said television transmission signal by said signal source that identifies the current programming content of said transmission signal, and 3) information identifying the time at which said request is made, the identity of the information content of said television transmission signal; and
   b) matching said identification tag with reference information identifying the location of said content related information in said information source, said reference information being stored in a network database accessed by said network.

51. The method of claim 50, wherein said transmission signal identification information comprises channel identification information, said network employing said channel identification information with said identification tag and time of request information to determine the information content of the television transmission signal being received by said terminal at the time said request is generated.

52. The system of claim 50, further comprising the steps of generating a master database of reference information for a plurality of broadcast television transmission signals which identifies the location in said information source of Internet based information related to the information content of each said broadcast television transmission signal, and transmitting information in said master database to said network database.

53. The method of claim 52, wherein said reference information in said master database includes Uniform Resource Locators (URLs) for Internet locations containing information which is related to the information content of each said broadcast television transmission signal.

54. The method of claim 53, wherein said step of said network accessing said content related information further comprises accessing HTML data from the Internet at locations specified by said URLs.

55. The method of claim 50, further comprising the steps of:

1) receiving a plurality of transmission signals at a data collection center;

2) removing identification tags from said transmission signals; and 3) transmitting said identification tags to said network receiver.

56. The method of claim 52, further comprising the steps of 1) providing in said master database, a plurality of different information location identifiers for said identification tag, each of which identifies demographic specific information in said information source that is related to the programming content of said transmission signal;

2) identifying information location identifiers in said master database which match demographics corresponding to said network; and 3) transmitting only those information location identifiers to said network database.

57. The method of claim 47, wherein said step of said network transmitting said content related information to said first terminal further comprises connecting said first terminal to an Internet browser application located in said network, and downloading said content related information to said first terminal.

58. The method of claim 57, wherein said step of connecting said first terminal to an Internet browser application further comprises connecting said first terminal to one of a plurality of active Internet browser applications in said network.

59. The method of claim 47, wherein said step of generating a request further comprises a user entering a request in said first terminal for Internet based information which is related to the information content of a television broadcast currently being viewed by said user on said television signal receiving device.

60. The method of claim 59, wherein said user enter said request by actuating a button on a remote control device.

61. The method of claim 47, wherein said step of transmitting said Internet based information to said first terminal comprises inserting said information in a television transmission signal being broadcast by said network on one of said receiver channels in said first terminal.

62. The method of claim 61, wherein said information is inserted in the vertical blanking intervals of said television transmission signal.

* * * * *